March 28, 1950          T. F. LILLY          2,502,161

ICE PICKING AND GRADING MACHINE

Filed Aug. 16, 1943          5 Sheets-Sheet 1

Inventor
Thomas F. Lilly,
By
Attorney

March 28, 1950 T. F. LILLY 2,502,161
ICE PICKING AND GRADING MACHINE
Filed Aug. 16, 1943 5 Sheets-Sheet 2

March 28, 1950

T. F. LILLY 2,502,161

ICE PICKING AND GRADING MACHINE

Filed Aug. 16, 1943

Inventor
Thomas F. Lilly,
By
S. W. Dahn.
Attorney

Patented Mar. 28, 1950

2,502,161

UNITED STATES PATENT OFFICE 2,502,161

ICE PICKING AND GRADING MACHINE

Thomas F. Lilly, Memphis, Tenn.; Teresa K. Lilly executrix of said Thomas F. Lilly, deceased Application August 16, 1943, Serial No. 498,840

20 Claims. (Cl. 241—60)

My invention relates to an ice picking and grading machine and it is an object of the same to provide, in connection with a machine having ice picking means and a rotary grading sieve, a means for maintaining the same at a low temperature so as to prevent accumulation of ice on or about the sieve, such means being termed by me sub-cooling means. Such machines are commonly operated in vaults wherein the temperature is low, e. g., about 30° F., but frequently the temperature is allowed to rise as when a vault door is allowed to remain open for a short time. Warm air rushes in and the ice particles on the screen melt and later freeze again, clogging the screen and loading it with ice. Such clogging and loading interfere in obvious ways with proper operation of the machine.

Since there are usually refrigerant coils at the top of such vaults I have taken advantage of such cooling of the upper air as is caused by the cooling coils to provide means that will keep the temperature of the machine normally down to approximately 10° F. below that of the remainder of the vault, regardless of conditions outside the machine.

Another object of the invention is to prevent any melting of the ice fragments on their way to the grading means. For example, in one form of my invention the ice fragments produced by the picking means are conveyed to the grader by an elevating conveyor. By preventing access of heat or of warm air to the ice pieces in their travel adhesion and regelation are prevented and the pieces remain at desired size and are prevented from sticking to parts of the mechanism.

Another object of the invention is to provide means for protecting the machine against dripping of water and ice particles thereinto when the coils above it are being defrosted, thus avoiding contamination of ice in the machine and dirtying of the screens.

Another object is to provide means for preventing accumulation of ice on parts of the machine where such accumulation is objectionable, whether due to collection of broken ice or to freezing of water or watery vapor.

Referring to the drawings, which are made a part of this application and in which similar reference characters indicate similar parts:

Fig. 10, a vertical section on line 10—10 of Fig. 9,

Fig. 11, a section on line 11—11 of Fig. 10,

In the drawings, reference character 20 indicates a hopper or chute into which cakes of ice, which may be of the conventional size of approximately 11 in. x 22 in. x 3 to 4 feet high may be inserted and picked to pieces by the rotary pick drum 21. Such blocks are commonly scored and split so as to make blocks weighing from 25 to 100 pounds, and these or other sizes may be used in machines of various sizes built according to my invention, as may be desirable on account of the size of the machine or for other reasons. It is to be understood that various of the expedients herein disclosed for treatment or handling of "picked" ice are equally applicable to ice formed in small pieces or fragmented in any other manner than as herein disclosed, and that terms such as "cracked," "chipped" and "broken" are, therefore, used in a descriptive sense, rather than in a limiting sense. The parts above referred to may be as in my Patent No. 2,237,078, but in a preferred form of the invention as herein disclosed I provide an elevator for feeding the broken ice to the grader 22, said elevator comprising an endless band or belt trained about a pair of pulleys 24, 25 which are solid so that no ice fragments can enter their surfaces and interfere with their action on the band 23. Solid pulleys also contribute to neatness of appearance and to cleanliness of the machine, and so make for good sanitation. The lower pulley is driven by suitable means independent of other driven parts, such as a separate motor or, as here shown, by a belt pulley 25' driven by a separate motor (not shown).

The belt carries buckets 26 so formed and co-ordinated with the speed of the linear travel of the belt as to avoid any sliding of the ice fragments on the buckets, which would give rise to friction and so might cause melting of the ice. For this purpose the bottoms of the buckets have an inclination of about 7° from the horizontal, and the conveyor is run at a speed of about 250 ft. per minute. The ice fragments are taken up on a floor of a bucket and travel to the top of the conveyor and are thrown into the rotary sieve, all without any slipping or sliding on the bottom of the bucket or any other part of the elevator during such travel.

Each run of the conveyor is enclosed separately in a casing comprising vertical sides 27, 27 and ends 28, said casing being open at 29 to permit the ice blocks to enter, and being also open at 30, as further explained hereinafter.

Figures 10, 11, 13, 14:
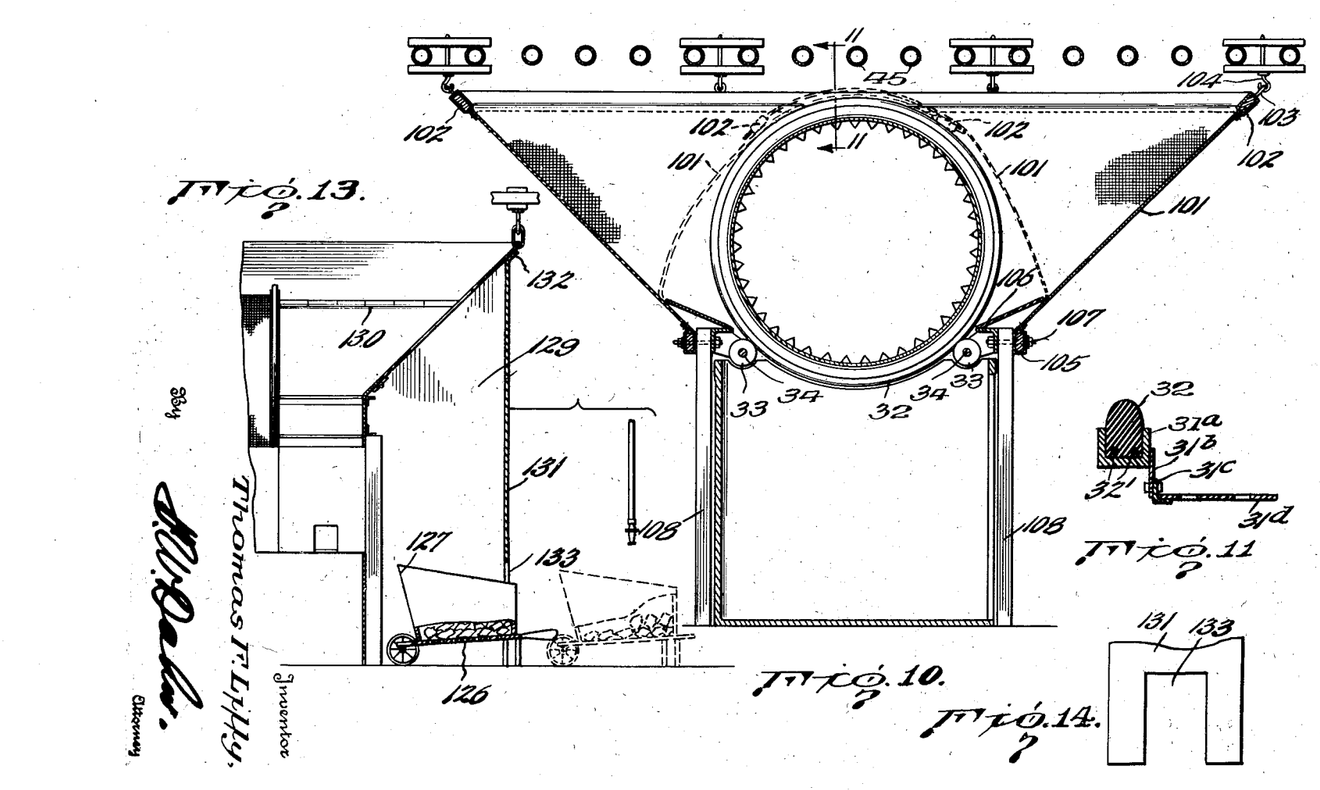

The rotary grader has at each end a rim 31 with a friction ring 32 of rubber or other suitable composition encircling it in some such manner as that shown in Fig. 11, where an annulus 31a that is U-shaped in cross section is welded to a flat ring 31b that is bolted to another ring 31c of L-shaped section that is secured to the end of the screen 22. Preferably the tire 31 contains wires 32'. The friction rings or tires at each end of the screen rest on friction wheels or gears 33 of any suitable material and construction, said gears being mounted on shafts 34, 34 and being connected by a belt and driven by a separate motor (not shown) thus frictionally driving the grading cylinder. The advantages of such a drive in a machine of this character are several. Thus the rubber tires contribute immeasurably to the quiet, smooth, clean running of the machine, the use of noisy, clashing gears and chains being thus avoided; in the operation of the machine ice frequently forms on the screen and loads it down or it forms between the grading cylinder and some of the fixed parts or pieces of ice fall between such members. In any such event the rotation of the cylinder is resisted, and may even be impossible on account of the bridging of ice between rotary and fixed parts. If the machine is built with a central shaft and spokes extending therefrom to the periphery the spokes become twisted and broken under such conditions. Frequently also the screen is torn, and in any event there is loss of time and costly repairs are often called for before running can be resumed. But when the grading cylinder is frictionally driven it can merely stand still in case of such accidents as just described, and remain so until the obstruction has been removed.

Figures 2, 4, 5:
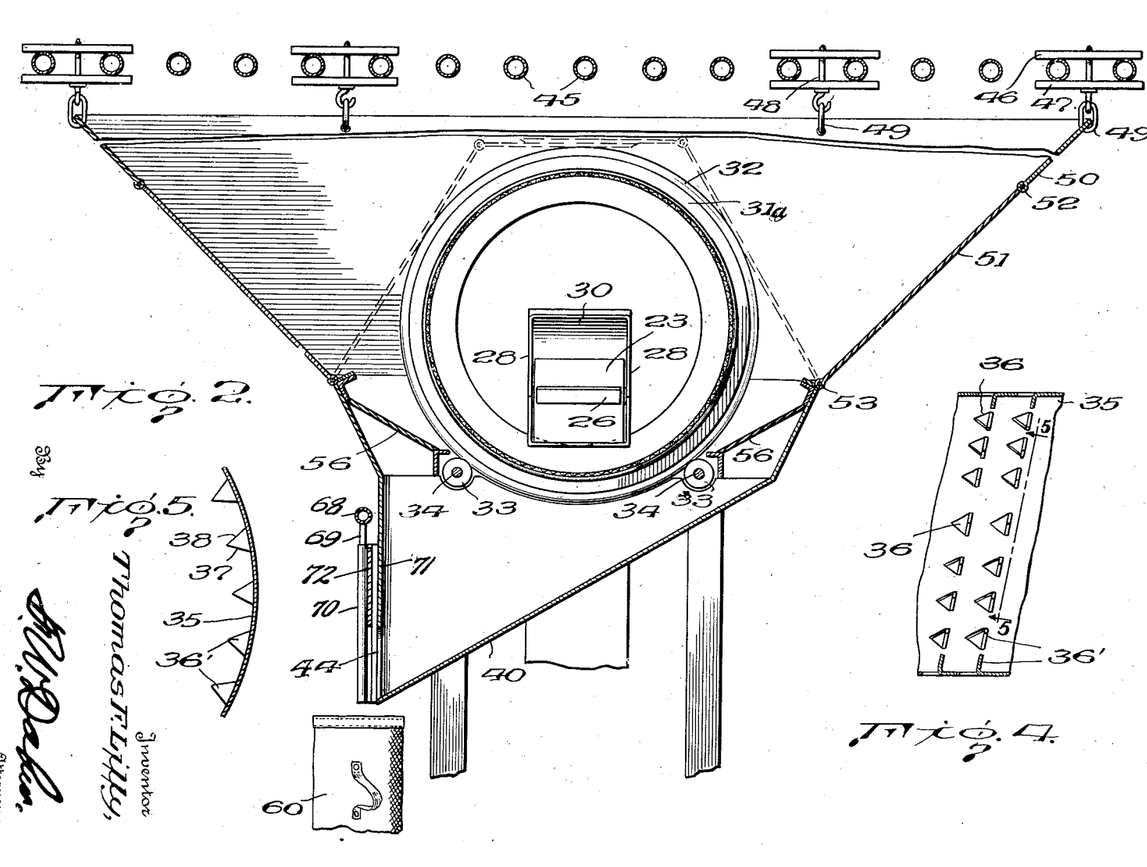
Fig. 2, a vertical cross section of the same on line 2—2 of Fig. 1.
Fig. 4, an elevation of the inside of a screen of modified form.
Fig. 5, a section of the same.

The body of the screen is preferably of such material as described in my previous patent, but I have also shown in Figs. 4 and 5 a screen 35 of a different variety, said screen consisting of sheet metal with triangular apertures 36 formed by striking up triangular projections 36' each cut along two edges 37, 38 and bent inwardly of the screen, as shown at the bottom of Fig. 4, the third side of the projection remaining attached to the body of the sheet. These projections are arranged with their bases lying in a spiral running along the inner periphery of the cylindrical screen, and thus they serve both to provide apertures for escape of ice fragments, and also as means for feeding the mass of fragments axially of the screen. A screen of this type has the further advantage of low cost as compared with a woven screen of wire or flat strip material. Of course, as in a mesh screen, the openings are smaller in that section of the screen next to the outlet of the elevator, and increasingly larger in successive sections, so as to discharge snow ice to the first bin 40, larger fragments to the next bin 41, and so on, the largest pieces being discharged through the end of the cylinder into the bin 43.

Each of the bins has a floor at an inclination of approximately 30° to the horizontal leading to a wide opening 44. I have found that ice fragments will slide freely down an incline of this angle while a floor so inclined will bear the bulk of the weight of the ice. The greater part of the weight being borne by the floor, the ice will be much less likely to arch over and the wide angle produced by the low angle of the floor makes it almost impossible for the ice to arch over. This feature, together with the sub-cooling features hereinafter discussed, are effective to prevent coalescing or regelation of the ice fragments in the bin and consequent interference with the free flow of sized ice out of the bin as it is taken out of the port 44. When the bins are underneath the graders it is at least as important to have the cold air flowing through the bins as through the sieves, in order to keep the fluent ice in dry condition so that it will flow freely.

Hinged to the upper end of the frame there are flat side and end pieces of sheet metal, canvas or other suitable sheet material, preferably inclined outwardly and upwardly and being detachably connected to cooling coils above the machine by means comprising upper blocks 46 and lower blocks 47 connected by bolts 48 bent at their lower ends to form hooks adapted for engagement by links 49 secured to said side and end pieces. Preferably the side members are formed as two pieces 50 and 51 hinged together at 52, the lower piece being hinged to the machine frame at 53 and adapted to fold over and cover the machine as indicated in dotted lines at the upper part of Figs. 2 and 10, thus protecting the machine when not in use and also protecting it against falling ice and water during defrosting of the coils above it.

The end members are hinged at 55 to swing downward out of the way of the foldable side members. Baffles 56, 56 cause the descending cold air coming down from the coils to flow about and through the cylinder and hinder its progress downward through the bins and so out of the machine. Vertical side and end members can be used with considerable success, and they are obviously an improvement over the usual practice of having no conduit whatever to guide and confine the downward flowing cold air from the coils 45, but by slanting the side and end members outward at an angle of about 45° the cooling action is increased to four or five times as much as that produced by the use of mere vertical side and end members.

The above arrangement, which I term a subcooler, has another function besides that of keeping the screen clean and free to move and to sift freely, in that the portion 56 of the casing above the picker is so formed as to serve as a conduit for cold air to pass downward to the opening at 29, and into the casing of the conveyor where the buckets create an upward current of cold air that is carried along with the broken ice to prevent melting. At the other side of the conveyor cold air passes through opening 30 and is carried down by the descending buckets, keeping them dry and cold so that contact therewith will not melt the ice chips picked up by the ascending buckets. The cold air in passing out through chute 20 helps to congeal any moisture on the ice blocks as they are fed to the chute.

A substantial part of the cold air from the coils finally passes out through ports 44 of the ice bins and in its passage through the bins it keeps the crushed sized ice pieces dry and cold, thus preventing cohesion of fragments and adhesion thereof to the contiguous surfaces of the bins. It is very difficult to keep sized ice in storage and it must be kept at a temperature below 32° F. in order to keep it dry. If the temperature rises the ice becomes damp, absorbs odors, collects bacteria and algae, rusts everything it comes in contact with, and mats together so that it becomes very difficult to handle. These difficulties are avoided, as to the bins 40 to 43, by the use of the sub-cooler. As above stated the sized ice, being kept at a low temperature, will flow freely. In previous arrangements a flat-bottomed bin was used and the ice was taken out with a shovel, or else a funnel-shaped bin was utilized, but in the case of such expedients there is continual difficulty due to the fact that the crushed ice "bridges" over the outlet and so stops the flow. With my form of bin much labor and delay are avoided.

I have shown at 60 in Fig. 2 a conventional ice-carrying bag under the outlet 44 of a bin, but of course any other carrying or conveying means may be used.

I have found that very important advantages may be derived in my machine from the use of currents of air other than the slow-flowing thermosyphonic current in the main conduit provided by parts 50, 51, 54, 56, etc., said current passing down from the cooling coils through the fragmentation and grading means and then through the dispensing and storage bins. Thus by means of an electric fan 61, driven by the usual fan motor, air may be drawn through an intake 61' and forced through either or both of a pair of conduits 62 and 63. By means of conduit 62 the air is led into the conveyor and down on the lower pulley 24. Any small fragments of ice that may be caught on the belt are blown out to the outer side of the belt, but what is much more remarkable, the air current blowing on the pulley keeps the moisture from congealing on the pulley and so interfering with its proper action on the belt, and in case the fan is started when there is already a coating of ice on the pulley the ice will actually be removed from the pulley by the action of the draft of cold air, and the pulley will thereafter remain free of ice. The current produced by the fan is also further useful in that it helps to start the air flowing downward from the intakes 30 and 64 (Fig. 1) from the cooling coils 45 through the elevator and the picker drum 21 and out of the chute 20.

As a feature that is sometimes desirable I have shown a swinging door 65 (Fig. 1) pivoted at 66 and so mounted that it may be pushed inward by an entering block of ice, missing the breaker bar mechanism shown at 67, and then closing again as the block passes beyond the door.

Figures 6, 7, 8:
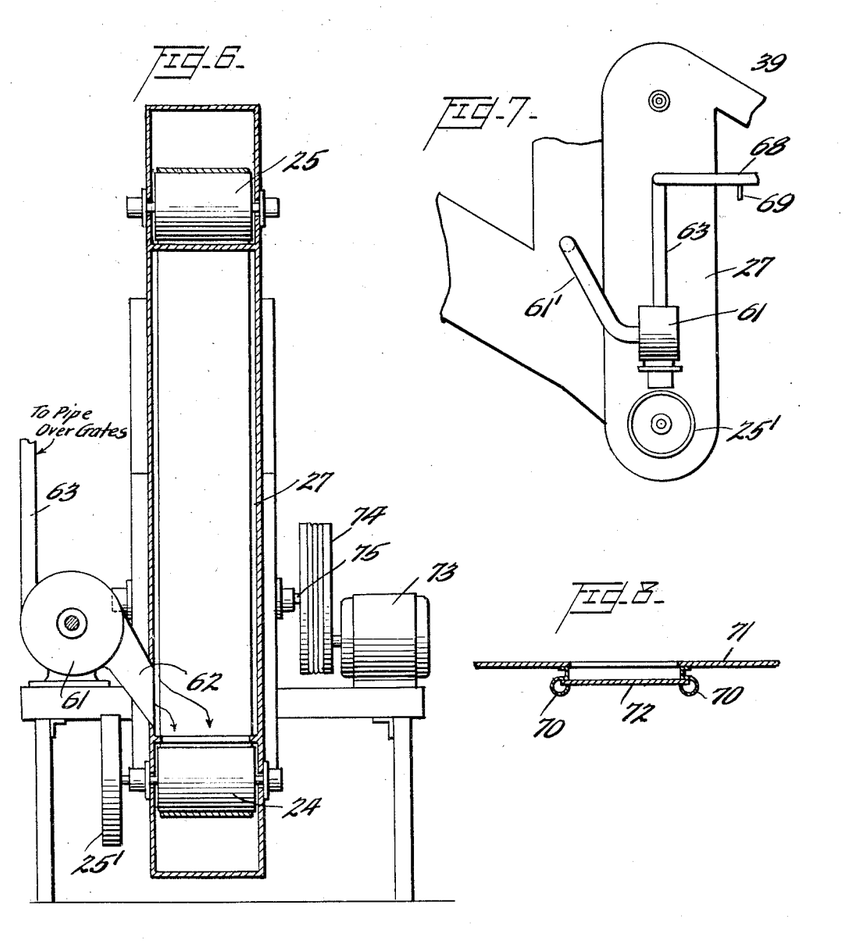
Fig. 6, a partial vertical section on line 6—6 of Fig. 1, on an enlarged scale.
Fig. 7, a partial side elevation of the machine of Fig. 1, seen from the left in Fig. 6.
Fig. 8, a horizontal section on line 8—8 of Fig. 1.

The air passing through the conduit 63 goes to a horizontal tube 68 (Figs. 1 and 2) from which branches 69 lead downward to guides 70 mounted on the front wall 71 (Fig. 8) forming part of each of the bins 40 to 43. Doors 72 are slidably mounted in each of a pair of the guides 70 so as to open the doorways in the bins to the desired extent as the doors are moved upward. The purpose of this construction is to do away with the formation of ice in and about the guides for such doors. Normally ice will form at the upper ends of the doors and along and about the guides and hinder or even prevent movement of the doors to open or close them, but by blowing air under pressure along the side edges of the doors formation of ice there is prevented. Since the guides are open at their inner sides an air current from each guide will blow across the upper end of the corresponding door and effectually prevent formation or collection of ice there, and in case ice has formed before the current starts the blast will remove the ice.

The pick drum may be driven as in my patent above mentioned, but preferably it is driven by means of a motor having two or even more speeds, this motor being indicated at 73 as connected through reducing gearing 74 to the shaft 75 of the pick drum 21, the object being to increase the possibilities of the machine to make ice in such size as desired by the user. Thus by driving the drum at one speed the ice fragments produced will be in one range of sizes, while if it is driven at a higher speed the range of sizes will be different, i. e., at the lower speed the pieces will run larger, or through a range of larger sizes, whereas at the higher speed the pieces will run smaller, i. e., through a range of smaller sizes. This is a very practical advantage, as numerous sizes are called for by different customers to meet different situations or for various uses, and it is secured in varying degree by the several expedients herein disclosed for that end, as well as by the means disclosed in my prior patent.

Figures 1, 3:
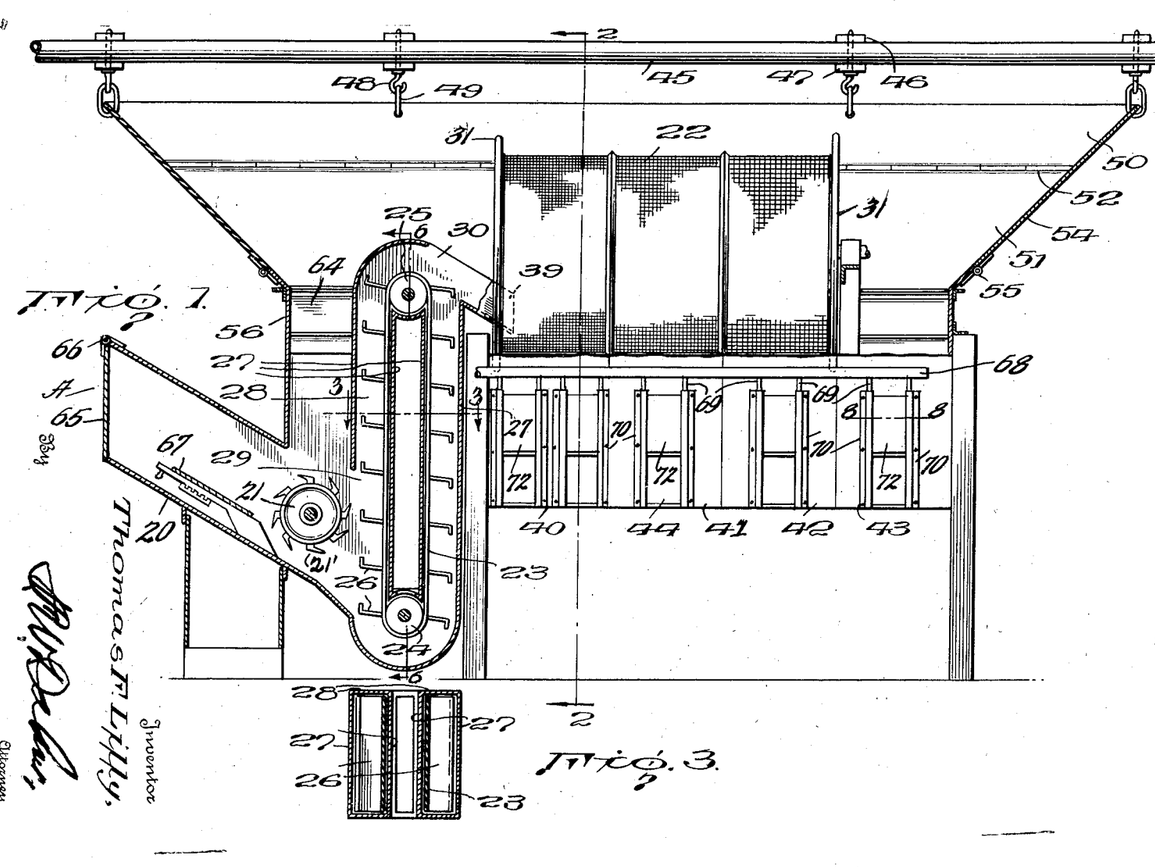
Fig. 1 is a side elevation of one form of my invention, partly in section.
Fig. 3, a horizontal section on line 3—3 of Fig. 1.
Figures 9, 12:
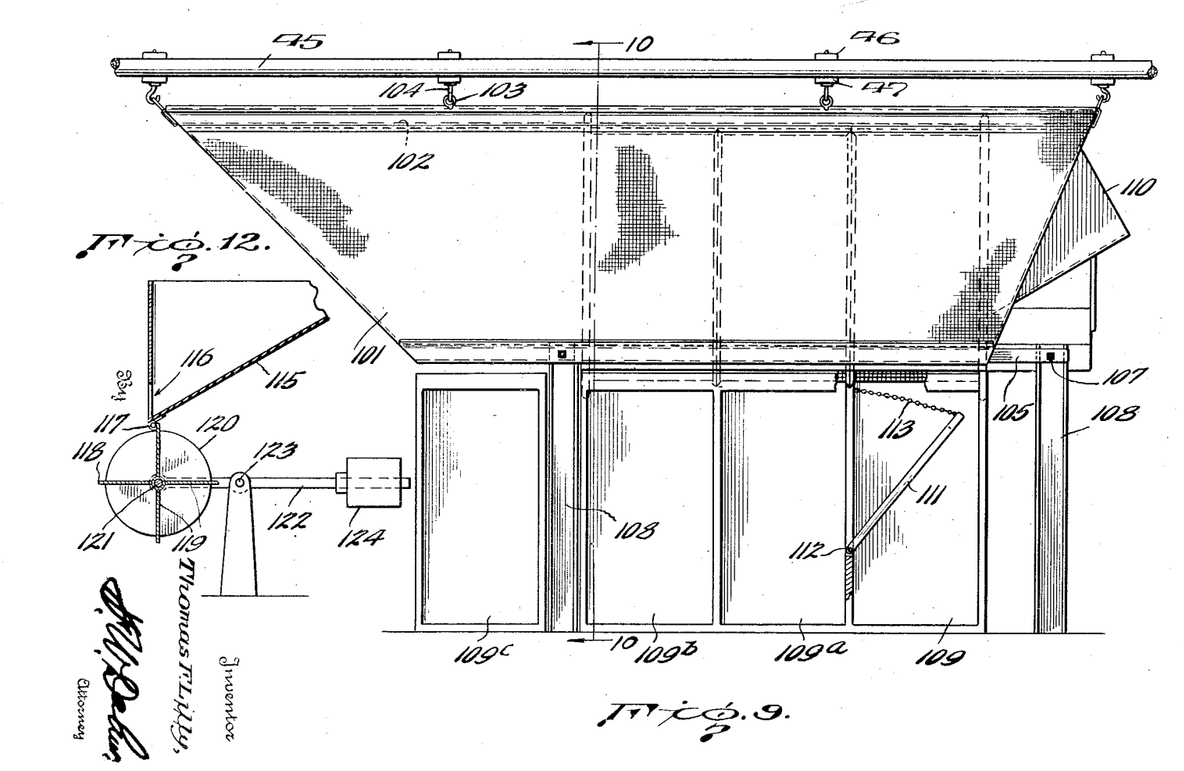
Fig. 9, a side elevation of a modification, partly in section.
Fig. 12, a partial vertical section, showing the relation of a bin to an automatic weigher, Fig. 13, a part section of another modification, and Fig. 14, a detail of parts shown in Fig. 13.

In the form of the invention shown in Figs. 9 and 10 the parts not specifically referred to may be as in Figs. 1 and 2. In these figures however the sub-cooler body 101 is preferably made of cloth such as canvas or other similar flexible material, e. g., leather, cellophane, etc. Preferably the conduit is made as a single funnel-like member having sheets of canvas stitched together at the corners. The side portions have at their upper ends battens 102 provided with links 103 for attachment to the hooks 104 carried by the cooling coils, as in the form previously described. The canvas end members may also be reinforced at their upper ends if desired but are preferably left unreinforced so that they can fold in under the battens on the side portions of the funnel 101. At the lower end of the canvas portions they are wrapped about battens 105 that are secured to side frame angle iron members 106 by bolts 107 passing through posts 108.

The sieve is driven, as before, by friction rings 32 resting on friction gears or pulleys of rubber or the like on driven shafts 34.

Instead of the bins with inclined bottoms I have here shown cubical bins 109, 109a, 109b, 109c to receive the different grades of ice supplied by the rotary grader, which are here shown as being supplied, by means 110 such as in my prior patent, with picked fragments of ice. The bins are shown as open at one side, though they may be closed by means including suitable doors or gates. A useful feature of such bins is a swingable partition valve 111 on one or more of the partitions, here shown as hinged at 112 and having its position limited by a chain or cord 113 adapted to be fastened in adjusted position in any suitable manner. In this showing the bin 109 receives the smallest particles of ice (known in the trade as snow ice) the greater part of the smallest fragments falling through the sieve at once, and increasingly larger sizes rattling progressively farther along the sieve to the next bin or to other bins still farther from the inlet.

If it is desired to vary the proportions of ice discharged respectively to bins 109 and 109a the position of the swingable partition is changed, and it will be obvious that this may be varied to any desired extent, from a position where only a very small amount of the very finest ice fragments (snow ice) falls into bin 109 and a much greater quantity goes to bin 109a, to a position where a much larger proportion of the ice is supplied to bin 109. Similar arrangements may be made with respect to the other bins, but the arrangement is particularly felicitous with respect to bin 109 because this machine makes so very little snow ice.

In Fig. 12 I have shown an automatic weighing machine for weighing and dispensing weighed amounts of ice, the machine being shown as arranged in cooperative relation with a bin 115 having a port 116. The bin may be identical with those shown in Figs. 1 and 2 except that there is a catch 117 projecting below the lower end of the bin in position for engagement with the outer ends 118 of the vanes 119 of a series arranged between disks 120, which disks are located at the ends of the vanes and coact therewith to form compartments to be filled with ice from the bin. At the intersection of the vanes the entire rotary receptacle which is provided with said compartments is pivoted at 121 on a beam 122 pivoted in turn at 123 and carrying a counterweight 124 that is adjustable along the beam and which holds the parts in the position shown until a quantity of ice is received in the active compartment sufficient to tilt the beam 122, the amount being predetermined by adjustment of the counterweight 124 so as to dispense any desired weight of ice. When the lever tilts the projections 117 and 118 separate, and then the rotary wheel is permitted to turn, dumping the filled compartment and bringing the next in series into position to be filled.

In the form of the invention shown in Figs. 13 and 14, all parts may be as in Figs. 1 and 2, or as in Figs. 9 and 10, as may be desired, but an extension is provided on the sub-cooler, said extension comprising side members 129 connected to the previously described side members at 130, and an end member 131 connected to an end member of the previously described sub-cooler at 132. The extension is of such size as to admit a vehicle of desired character, such as a wheelbarrow, a floor truck, or a larger truck or even a flat car, according to convenience or desire. For this purpose it is desirable to provide at the lower end of said end member 131 an aperture 133 of a size suitable to fit around the body of the vehicle intended to be used, or to fit approximately about the same. The utility of this arrangement arises out of the fact that it is often necessary to wash ice before sizing, either because some ice blocks may not be clean, or because it is desired to salvage scrap ice collected about a plant and usually not clean. Such ice is placed in a vehicle with a perforated bottom, e. g., the wheelbarrow shown and having a perforated bottom 126 and an elongated front member built at a low angle to aid in dumping the same, and the ice is washed by means of a hose or in some other way. After the washing the vehicle is moved through said opening to a position inside the extension, and cold air flows down from above, passing over and through the block of ice or mass of ice fragments and out through the perforated bottom and on out of the opening 133 in member 131 or out at some other point, as the case may be, quickly drying and/or freezing the moisture remaining on the ice, whether it be a block or a mass of fragments.

It will be obvious to those skilled in the art that many changes may be made in the devices of my invention and in the various features thereof, and that some of the features may be put to other uses than those set forth, all without departing from the spirit of the invention; therefore I do not limit myself to what is shown in the drawings and described in the specification but only as set forth in the appended claims. As one instance of such other uses, the method of blowing air on a surface where ice is liable to form may be usefully applied to household refrigerators to avoid the necessity of defrosting and to distribute an even temperature throughout the refrigerator.

I claim:

1. In combination with a machine for reducing blocks of ice to smaller fragments, said machine being adapted for use in a vault with overhead cooling coils, a conduit enclosing normally-exposed ice-containing portions of said machine, said conduit extending upward toward said coils so as to form a closed conduit for conducting cold air to said machine, said conduit being collapsible and being so constructed and arranged as to cover the machine, and the ice therein when collapsed, so as to protect the same, as when the coils are being defrosted.

2. A device for use in a vault with overhead cooling coils, comprising means normally exposing ice to room temperature in the vault, a conduit surrounding the area in which ice is normally so exposed, said conduit extending upward toward said coils to conduct cold air from said coils to said ice, and quickly detachable means for suspending said conduit from said coils.

3. A device for use in a vault having overhead cooling coils, comprising means normally exposing ice to the room temperature of the vault and a conduit surrounding the space in which ice is normally so exposed, said conduit extending upward toward said coils to conduct cold air from said coils to said ice, said conduit being collapsible into a position to cover said ice and to protect it while said coils are being defrosted.

4. A device for use in a vault having overhead cooling coils, comprising means normally exposing ice to the room temperature of the vault and a conduit surrounding the space in which ice is normally so exposed, said conduit extending upward toward said coils to conduct cold air from said coils to said ice, said conduit being made of flexible sheet material collapsible into a position to cover said ice.

5. A device for use in a vault having overhead cooling coils, comprising means normally exposing ice to the room temperature of the vault and a conduit surrounding the space in which ice is normally so exposed, said conduit extending upward toward said coils to conduct cold air from said coils to said ice, said conduit being collapsible into a position to cover said ice and to protect it when said coils are being defrosted, and quickly detachable means connecting the upper end of said conduit to said coils.

6. A device for use in a vault having overhead cooling coils, comprising means normally exposing ice to the room temperature of the vault and a conduit surrounding the space in which ice is normally so exposed, said conduit extending upward toward said coils to conduct cold air from said coils to said ice, the walls of said conduit flaring outward from their lower end to their upper end so as to embrace a relatively large area adjacent said cooling coils and to conduct cold air to a relatively small area to be cooled thereby.

7. In combination with an ice machine adapted for use in a vault having overhead cooling coils, said machine having ice picking means at a relatively low level, ice grading means at a relatively high level, means for elevating ice fragments from said picking means to said grading means, said elevating means including a bucket conveyor with separately enclosed runs, and sub-cooling means comprising a conduit leading from said coils to the enclosure for the active run of said conveyor adjacent said picking means so that a current of cold air is caused by said buckets to move along with the ice fragments carried to the grading device.

8. A device as in claim 7, said conduit also communicating with the enclosure for the other run of said conveyor adjacent to said grading device, so that the buckets therein maintain a current of cold air in contact with the descending buckets, as and for the purposes set forth.

9. In a vault, the combination of overhead cooling coils, means for exposing ice to room temperature in the vault, a demountable conduit suspended from the overhead cooling coils and extending from a level close to the coils down past the space occupied by such ice and surrounding said space.

10. The combination of a vault having overhead cooling coils, a conduit extending from the neighborhood of said coils approximately to the floor thereof and providing a path for a downward current of thermo-syphonically circulating air cooled by said coils, said conduit having an opening in its wall, and a vehicle removably extending through said opening into said path to a distance sufficient to expose a load of ice carried thereby to the current of cold air to dry and/or freeze the moisture thereon, said vehicle having a perforated bottom for permitting water to drain from wet ice carried by the vehicle.

11. In combination, a vault equipped with overhead cooling coils, a conduit having an upper end in proximity to said coils and providing a path for gravity flow of air cooled by said coils, and a wheeled vehicle having a body with a perforated bottom to permit water to drain from ice carried by the vehicle, said conduit having an opening through which the body of the vehicle removably projects into said path, the edges of said opening fitting about the vehicle body, so that a current of cold air passes about said ice and through said perforated bottom.

12. In combination with a room having overhead cooling coils, ice picking and sizing apparatus in said room, said apparatus comprising ice picking means, ice sizing means receiving ice fragments from the picking means and grading said fragments according to size, a conduit enclosing said apparatus, said conduit extending downward from the region of said coils toward the floor of the room so as to form a thermo-syphonic current of sub-freezing air passing from said coils about said apparatus, said apparatus including an elevating conveyor for carrying ice from said picking means upward to the sizing means, a casing enclosing said conveyor, a port at the bottom of said casing for receiving ice from said picker and cold air from said conduit, and a port leading from said conduit into the upper end of said casing for also receiving cold air from said conduit.

13. The combination with a room having overhead cooling coils, ice picking and sizing apparatus in said room, said apparatus comprising ice picking means, ice sizing means elevated with relation to the picking means, and an elevating conveyor for ice, a casing enclosing said conveyor, a conduit enclosing said picking and sizing apparatus, said conduit extending downward from said coils and providing a path for gravity flow of air cooled by said coils down over said apparatus, and a port connecting said casing about said elevator to the conduit to provide a current of cold air about said conveyor.

14. The combination with a room having overhead cooling coils, ice picking and sizing apparatus in said room, said apparatus comprising ice picking means, ice sizing means elevated with relation to the picking means, a belt conveyor for carrying ice from the picking means to the sizing means, a conduit enclosing said picking and sizing apparatus, said conduit extending downward from said coils and forming a conduit for gravity flow of a current of cold air from said coils over said machine, upper and lower pulleys supporting said conveyor, and a fan connected to draw cold air from said conduit and blow it against the lower pulley of said conveyor.

15. The combination with a room having overhead cooling coils, ice picking and sizing apparatus in said room, said apparatus comprising ice picking means, ice sizing means elevated with relation to the picking means and an elevating conveyor for carrying the ice fragments to the sizing means, a casing about said conveyor, a conduit enclosing said picking and sizing apparatus, said conduit extending downward from the region of said coils and forming a thermo-syphonic means for conducting a descending current of cold air from said coils over said apparatus, said sizing means including bins each arranged to receive ice fragments of a different size, slidable gates for said bins, a fan connected to said conduit to draw cold air therefrom, pipes leading from said fan to said gates, and ports in said pipes for conducting air under pressure against the edges of said gates, as, and for the purpose set forth.

16. The combination of a room having means for maintaining a low temperature therein, an ice picking and grading machine located in the room, a belt conveyor for elevating broken ice, upper and lower pulleys for said conveyor, a fan in said room, a passage leading from said fan to a point adjacent the lower pulley and between the runs of the conveyor, and a port through which air from said passage impinges on the pulley, as and for the purpose set forth.

17. In an ice picking and grading machine, located in a room having means to maintain a low temperature therein, a belt conveyor for elevating broken ice, upper and lower pulleys for said conveyor, a fan in said room, a conduit leading from said fan to a point adjacent the lower pulley and between the runs of the conveyor, and a port in said conduit through which air from the fan is blown against the lower pulley and adjacent parts of the belt.

18. The combination with a room having overhead cooling coils, ice picking and sizing apparatus in said room, a conduit enclosing said picking and sizing apparatus, said conduit extending downward from the region of said coils and forming a thermosyphonic means for conducting a descending current of cold air from said coils over said apparatus, said sizing means including bins each arranged to receive ice fragments of a different size, slidable gates for said bins, a fan connected to said conduit to draw cold air therefrom, pipes leading from said fan to said gates, and ports in said pipes for conducting air under pressure against the edges of said gates, as and for the purpose set forth.

19. A device for use in a vault with overhead cooling coils, comprising means normally exposing ice to room temperature in the vault, a conduit surrounding the space in which ice is normally so exposed, said conduit extending upward toward said coils to conduit cold air from said coils to said ice, the walls of said conduit flaring outward adjacent said coils at an angle of approximately 45° so as to embrace a relatively large area adjacent said cooling coils and to conduct cold air to a relatively small area to be cooled thereby.

20. A device for use in a vault having overhead cooling coils, comprising an ice picking and grading machine, a conduit having a lower portion surrounding the space in which said machine is located, said conduit extending upward toward said coils to conduct cold air from said coils to said machine, the walls of said conduit flaring outward adjacent said coils at an angle of approximately 45° so as to embrace a relatively large area adjacent said cooling coils and to conduct cold air to the portion of smaller cross section occupied by said machine.

THOMAS F. LILLY.

REFERENCES CITED

The following references are of record in the file of this patent:

UNITED STATES PATENTS

| Number | Name | Date |
| --- | --- | --- |
| Re. 3,992 | Stoll | May 24, 1870 |
| 150,016 | Fuller | Apr. 21, 1874 |
| 263,634 | Webster | Aug. 29, 1882 |
| 317,782 | Henderson | May 12, 1885 |
| 413,544 | Peace | Oct. 22, 1889 |
| 442,765 | Brennan | Dec. 16, 1890 |
| 446,319 | Baxter | Feb. 2, 1891 |
| 485,730 | Abbe | Nov. 8, 1892 |
| 488,760 | Gates | Dec. 27, 1892 |
| 515,812 | Barr | Mar. 6, 1894 |
| 523,408 | Robinson | July 24, 1894 |
| 530,526 | Holden | Dec. 11, 1894 |
| 706,197 | Owen | Aug. 5, 1902 |
| 789,628 | Rhodes | May 9, 1905 |
| 824,297 | Hopkins | June 26, 1906 |
| 894,425 | Culver | Jan. 28, 1908 |
| 895,234 | Blakely | Aug. 4, 1908 |
| 945,174 | Larson | Jan. 4, 1910 |
| 1,107,028 | Busch | Aug. 11, 1914 |
| 1,112,464 | Miller | Oct. 6, 1914 |
| 1,235,027 | Harrison | July 31, 1917 |
| 1,448,508 | Thum | Mar. 13, 1923 |
| 1,562,618 | Burch | Nov. 24, 1925 |
| 1,684,716 | Seeger | Sept. 18, 1928 |
| 1,687,300 | Loizillon | Oct. 9, 1928 |
| 1,728,131 | Noecker | Sept. 10, 1929 |
| 1,780,425 | Hull | Nov. 4, 1930 |
| 1,788,364 | Gies | Jan. 6, 1931 |
| 1,793,246 | Philips | Feb. 17, 1931 |
| 1,913,857 | Scherer | June 13, 1933 |
| 1,926,060 | Peters | Sept. 12, 1933 |
| 1,934,133 | Lauderback | Nov. 11, 1933 |
| 1,944,932 | Gemeny | Jan. 30, 1934 |
| 1,964,822 | Klippel | July 3, 1934 |
| 1,974,113 | Kinslow | Oct. 18, 1934 |
| 2,063,771 | Taylor | Dec. 8, 1936 |
| 2,118,796 | Orrison | May 24, 1938 |
| 2,133,521 | Wussow | Oct. 8, 1938 |
| 2,222,024 | Field | Nov. 19, 1940 |
| 2,227,776 | Anderson | Jan. 7, 1941 |
| 2,237,078 | Lilly | Apr. 1, 1941 |
| 2,237,256 | Finnegan | Apr. 1, 1941 |
| 2,246,723 | Delivuk | June 24, 1941 |
| 2,252,101 | Tveter | Aug. 12, 1941 |
| 2,259,920 | Baer | Oct. 21, 1941 |
| 2,264,049 | Miller | Nov. 25, 1941 |
| 2,271,436 | Lathrop | Jan. 27, 1942 |
| 2,297,604 | Bateman | Sept. 22, 1942 |
| 2,300,229 | Knowles | Oct. 27, 1942 |
| 2,312,478 | Randolph | Mar. 2, 1943 |
| 2,323,171 | Wayland | June 29, 1943 |
| 2,327,226 | Taylor | Aug. 17, 1943 |
| 2,353,909 | Lager | July 18, 1944 |

FOREIGN PATENTS

| Number | Country | Date |
| --- | --- | --- |
| 613,827 | Germany | May 25, 1935 |

OTHER REFERENCES

Gifford Wood Bulletin 113, copyright 1938, "Creasy ice breakers," pages 1, 2, 4, 7, 8, and 9. (12 pages with covers.) Copy in Div. 44 in Class 62, Ice Making Publications.